(12) United States Patent
König et al.

(10) Patent No.: US 7,894,677 B2
(45) Date of Patent: Feb. 22, 2011

(54) REDUCING HUMAN OVERHEAD IN TEXT CATEGORIZATION

(75) Inventors: Arnd Christian König, Redmond, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1415 days.

(21) Appl. No.: 11/350,701

(22) Filed: Feb. 9, 2006

(65) Prior Publication Data

US 2007/0183655 A1 Aug. 9, 2007

(51) Int. Cl.
G06K 9/64 (2006.01)
(52) U.S. Cl. .................. 382/224; 382/157; 382/128
(58) Field of Classification Search .......... 382/159, 382/224, 104, 128, 137, 165
See application file for complete search history.

(56) References Cited

U.S. PATENT DOCUMENTS

| | | | | |
|---|---|---|---|---|
| 3,275,986 | A * | 9/1966 | Dunn et al. ............ | 382/157 |
| 5,715,468 | A * | 2/1998 | Budzinski ............... | 704/9 |
| 5,805,730 | A * | 9/1998 | Yaeger et al. ............ | 382/228 |
| 5,819,247 | A * | 10/1998 | Freund et al. ............ | 706/25 |
| 6,337,927 | B1 * | 1/2002 | Elad et al. .............. | 382/225 |
| 6,404,923 | B1 * | 6/2002 | Chaddha ................. | 382/224 |
| 6,421,463 | B1 * | 7/2002 | Poggio et al. ............ | 382/224 |
| 6,480,621 | B1 * | 11/2002 | Lyon .................... | 382/157 |
| 7,263,486 | B1 * | 8/2007 | Hakkani-Tur et al. ...... | 704/243 |
| 7,266,562 | B2 * | 9/2007 | Levine .................. | 707/101 |
| 7,356,583 | B2 * | 4/2008 | Palmer et al. ........... | 709/224 |
| 7,447,353 | B2 * | 11/2008 | Diederichs et al. ....... | 382/165 |
| 7,565,403 | B2 * | 7/2009 | Horvitz et al. .......... | 709/206 |
| 2003/0221163 | A1 * | 11/2003 | Glover et al. ........... | 715/501.1 |
| 2004/0028276 | A1 * | 2/2004 | Okuda et al. ............ | 382/224 |
| 2004/0107088 | A1 * | 6/2004 | Budzinski ............... | 704/10 |
| 2005/0108200 | A1 * | 5/2005 | Meik et al. ............. | 707/3 |
| 2005/0185845 | A1 * | 8/2005 | Luo et al. .............. | 382/224 |
| 2005/0192792 | A1 * | 9/2005 | Carus et al. ............ | 704/2 |
| 2005/0213810 | A1 * | 9/2005 | Sabe et al. ............. | 382/159 |
| 2006/0177118 | A1 * | 8/2006 | Ibikunle et al. ......... | 382/137 |
| 2006/0222221 | A1 * | 10/2006 | Sathyanarayana .......... | 382/128 |
| 2006/0251320 | A1 * | 11/2006 | Diederichs et al. ....... | 382/165 |

OTHER PUBLICATIONS

Aho, et al. "Efficient Data Mining from Large Text Databases" Progress in Discovery Science (2002), 17 pages.

(Continued)

*Primary Examiner*—Wesley Tucker
*Assistant Examiner*—Aklilu K Woldemariam
(74) *Attorney, Agent, or Firm*—Lee & Hayes, PLLC (57) ABSTRACT

A unique multi-stage classification system and method that facilitates reducing human resources or costs associated with text classification while still obtaining a desired level of accuracy is provided. The multi-stage classification system and method involve a pattern-based classifier and a machine learning classifier. The pattern-based classifier is trained on discriminative patterns as identified by humans rather than machines which allow a smaller training set to be employed. Given humans' superior abilities to reason over text, discriminative patterns can be more accurately and more readily identified by them. Unlabeled items can be initially processed by the pattern-based classifier and if no pattern match exists, then the unlabeled data can be processed by the machine learning classifier. By employing the classifiers in this manner, less human involvement is required in the classification process. Even more, classification accuracy is maintained and/or improved.

16 Claims, 8 Drawing Sheets

OTHER PUBLICATIONS

Yamamoto, et al. "Using Suffix Arrays to Compute Term Frequency and Document Frequency for All Substrings in a Corpus" Computational Linguistics, vol. 27, No. 1. MIT Press, Cambridge, MA (2001), 30 pages.

Brill, et al. "Man vs. Machine: A Case Study in Base Noun Phase Learning" Proceedings of the 37th ACL Conference (1999), pp. 65-72.

Appelt, et al. "IJCAI-99 Tutorial" Introduction to Information Extraction Technology (1999), 41 pages.

Brill, et al. "Beyond N-Grams: Can Linguistics Sophistication Improve Language Modeling?" Proceedings of the 37th ACL Conference (1998) 6 pages.

Gusfield. "Algorithms on Strings, Trees and Sequences" Cambridge University (1997) pp. 41-60.

Manber, et al. "Suffix Arrays: A New Method for On-Line String Searches" Proceedings of the First Annual ACM-Siam Symposion on Discrete Algorithms (1990), pp. 319-327.

Ngai, et al. "Rule Writing or Annotation: Cost-efficient Resource Usage for Base Noun Chunking" Proceedings of the 38th ACL Conference (2000), 9 pages.

McCreight "A Space-Economical Suffix Tree Construction Algorithm" Journal of the ACM 23:262-272 (1976) pp. 262-272.

Pang, et al. "A Sentimental Education: Sentiment Analysis Using Subjectivity Summarization Based on Minimum Cuts" Proceedings of the 42nd ACL Conference (2004), 8 pages.

Beinke, et al. "The Sentimental Factor: Improving Review Classification via Human-Provided Information" Proceedings of the 42nd ACL Conference (2004), 7 pages.

Rosenfeld, et al. TEG—A Hybrid Approach to Information Extraction Proceedings of the 2004 CIKM Conference, pp. 589-596.

Ukkonen. "On-Line Construction of Suffix Trees" Algorithmica 14(3):249-260 (1995), 18 pages.

Kakkainen, et al. "Simple Linear Work Suffix Array Construction" Proceedings of 13th International Conference on Automata, Languages and Programming (2003), 11 pages.

Kim, et al. "Linear-Time Construction of Suffix Arrays" Proceedings of 14th Anual Sympossium on Combinational Pattern Matching (2003), 14 pages.

Alluru. "Space Efficient Linear Time Construction of Suffix Arrays" Proceedings of the 14th Anual Sympossium on Combinatorial Matching (2003), 11 pages.

* cited by examiner

REDUCING HUMAN OVERHEAD IN TEXT CATEGORIZATION

BACKGROUND

Many applications involve some type of sorting or filtering of data such as documents, files, email messages, and feedback. Most often the filtering or sorting is based on text included therein, and in particular, natural language text. Text processing relates to assigning labels to text or parts of text and can be performed for various reasons such as sentiment detection, classification, etc. Unfortunately, many applications in text processing require significant human effort for either labeling large document collections (e.g., when learning statistical models) or extrapolating rules from them (e.g., when using knowledge engineering). Regardless of the scenario, classification problems tend to frequently arise when dealing with natural language processing since a word or group of words extracted from a document, file, or message, for example, can have different meanings or connotations given their context.

There are currently two traditional approaches to solving such classification problems. The first involves machine learning where a large set of documents are labeled by hand and then sent through a statistical machine learning engine. This engine can abstract from the labeled documents what the presumed correct procedure is for labeling. When setting up a classification system in this manner, the main overhead lies in the manual examination of large text corpora required to assign the labels. In contrast, in many vendors now ship machine learning engines, which ca be customized to many tasks so that typically little overhead is required for the instantiation of the machine learning engine.

Instead of using an off-the-shelf machine learning technique, a rules system can be set up. An example of a rule system is as follows: Every time I see this pattern, then apply this label. Such rules have to be formulated by hand—presumably by a human. This rule-based engine is not very sophisticated, and even more so, there is again a significant human cost since a human is tasked with looking at all the rules and documents and then abstracting the rules and testing and verifying them. For each specific task or domain such as a spam filter (e.g., legitimate vs. spam) or a specific email filter (e.g., route messages from Jerry to a folder), a different engine or rule system must be built which essentially adds up to a substantial amount of human effort and cost. That is, machine learning models or rule engines can be re-used but every task requires new training data and updating a current engine requires either new training data or new manual construction of the relevant rule set. Thus, the ratio of human effort to accuracy is undesirably high.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate more efficient text categorization in part by mitigating human resource expenditures. As a result of minimizing or reducing the amount of human overhead involved in classifying natural language text, the level accuracy associated with such classifications can be maintained or improved over conventional techniques. This can be accomplished in part by employing a multi-stage (e.g., two) classification system based on discriminative patterns and machine learning. More specifically, discriminative patterns can be identified as follows. Given an amount of training data, patterns can be discovered or identified therefrom and then provided to a (human) user. The human can examine the patterns to determine whether each pattern is discriminative; that is, to identify the patterns that are sufficient by themselves, without any additional text or context, to assign a label. Though labeling is still involved here, a substantially smaller amount of labeling is performed thereby mitigating human resources. Once this pattern-based classifier is built, it can be employed to classify incoming items such as documents, messages, files, and the like. Though less human resources are expended, classification or labeling accuracy is maintained and/or improved despite the reduced costs.

A machine learning based classifier can also be employed as part of the two-stage classification system. When no pattern match is found using the pattern-based classifier, the text can be examined by a machine learning classifier for labeling.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject application relates to natural language processing. A significant fraction of the tasks studied in Empirical Natural Language Processing (ENLP) can be cast in terms of assigning labels to (parts of) text documents (e.g., text classification, POS tagging and certain types of information extraction). The predominant approaches to these types of problems can be divided into two classes: knowledge-engineering approaches, in which a human expert constructs grammars that match expressions over words and tags and assign labels based on these matches by hand; and machine-learning based systems, that use statistical models (e.g., Support-Vector Machines, Conditional Random Fields) which are trained using labeled corpora.

The specific choice between a knowledge-engineering framework or statistical model has been studied extensively in the research literature; however from the perspective of an end-user looking to deploy a given system, the true cost of setting up a specific ENLP task is often the overhead of having a human manually examine significant amounts of text to either infer expressions or assign training labels, as these often rely on one of the standard models or rule-engines supplied by the major vendors. Hence a significant part of the costs of deploying a NLP system is the overhead of this human effort. The systems and methods discussed herein facilitate reducing the amount of human effort required in empirical natural language processing, while retaining the accuracy of the NLP system.

For purposes of this discussion, consider a simple binary classification task: classifying user feedback e-mails into two categories: positive (+) and negative (−) feedback. Applying machine learning to this task requires the user to iterate over a large number of documents and to label each as (+) or (−). Using this approach, any additional knowledge the user may have regarding parts of the document that may induce the labeling tends to get lost, as it is not reflected in the labeling. Recovery of this lost knowledge may be possible via the machine learning model but only by abstracting from and processing many more documents. For example, in sentiment classification, only a small subset of the documents' content conveys sentiment. Hence, much useful information that exists in a document and is known to the user may not be leveraged due to the restricted information conveyed by the labeling.

When using knowledge-engineering, such knowledge can be actively exploited to quickly come up with candidate rules for labeling documents. However, these rules then require significant human effort, in which the document collection is examined for potential variations and counterexamples to each rule. Moreover, the rules a human designer intuitively comes up with, even when correct, may not correspond to the most frequent patterns in the text collection; consequently, additional human cycles are required to search the document collection for additional patterns. Consequently, a large part of the human work in knowledge engineering is dedicated to tasks that computers may be better suited for, such as extracting variations of phrases from large bodies of text.

Figure 1:
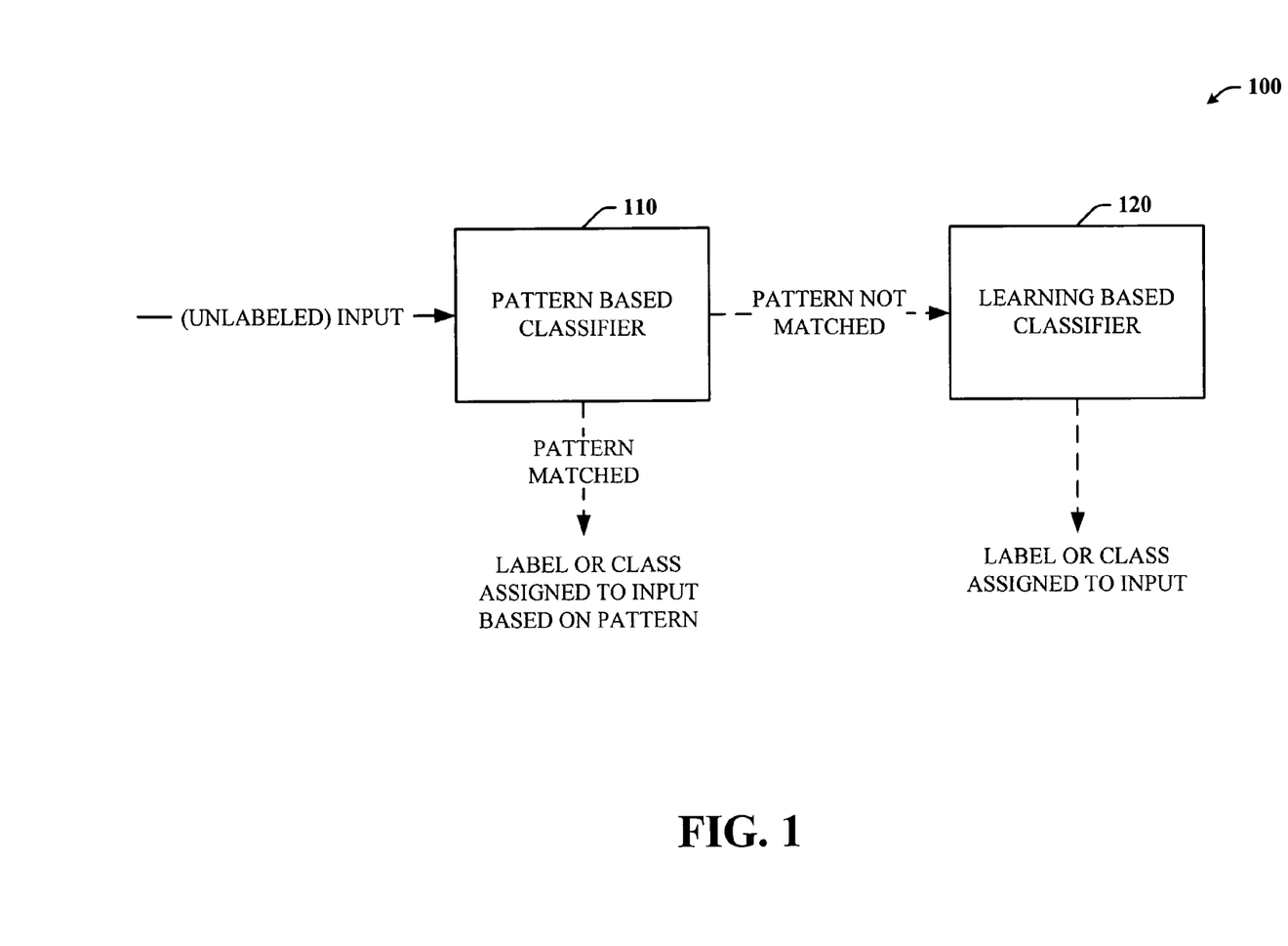
FIG. 1 is a block diagram of a classification system that facilitates obtaining a desired level of accuracy while expending less human resources.

In order to overcome these drawbacks, the subject application employs a multi-stage classification system 100 as illustrated in FIG. 1. This approach can employ a pattern-based classifier 110 and a learning-based classifier 120. A set of labeled training documents can be provided to train the pattern-based classifier. A pattern can refer to a regular expression over words with gaps. Text patterns based on a variant of regular expressions that are (a) frequent and that (b) highly correlate to the labeling can be extracted from the training documents. Such patterns are then presented to a human user who identifies patterns that are expressive enough to assign a classification label solely based on the existence of the pattern (in the text). That is, the patterns are sufficient by themselves to assign a label thereto without viewing the whole body of text. These can be referred to as discriminating patterns. In the example of the sentiment classifier, the phrase "I will switch . . . to XYZ Corp" could be marked as a discriminating pattern. However, the phrase "is slow"—which may be highly correlated as well but occur much more frequently—is not discriminative, as it is relatively easy to think of instances of contexts where it could be used in both positive and negative feedback.

A second classifier such as a machine learning classifier can be trained on at least a subset of the labeled training documents. When an unlabeled item or document is received, it can be passed through the pattern-based classifier 110 to ascertain whether its content matches any of the discriminative patterns. If a match is found, the document can be assigned a label (e.g., (+) or (−)). Otherwise, the document can be passed through the machine learning classifier 120 and labeled accordingly. Most patterns tend to be non-discriminative and thus any amount of available training data is usually insufficient to learn the discriminating patterns. Therefore, statistical models alone cannot learn or be trained to identify all or substantially all discriminating patterns. The advantages of this framework (100) are two-fold: (1) using a pattern-based classifier initially allows the capture of more complex and specific patterns then could typically be learned (due to sparsity of the training data) using machine-learning based approaches alone; and (2) from the knowledge engineering perspective, transparency of the sufficient text patterns exists as does the ability to leverage domain knowledge without having a human read through and abstract from a large collection of documents manually, as candidate patterns are detected automatically.

Figure 2:
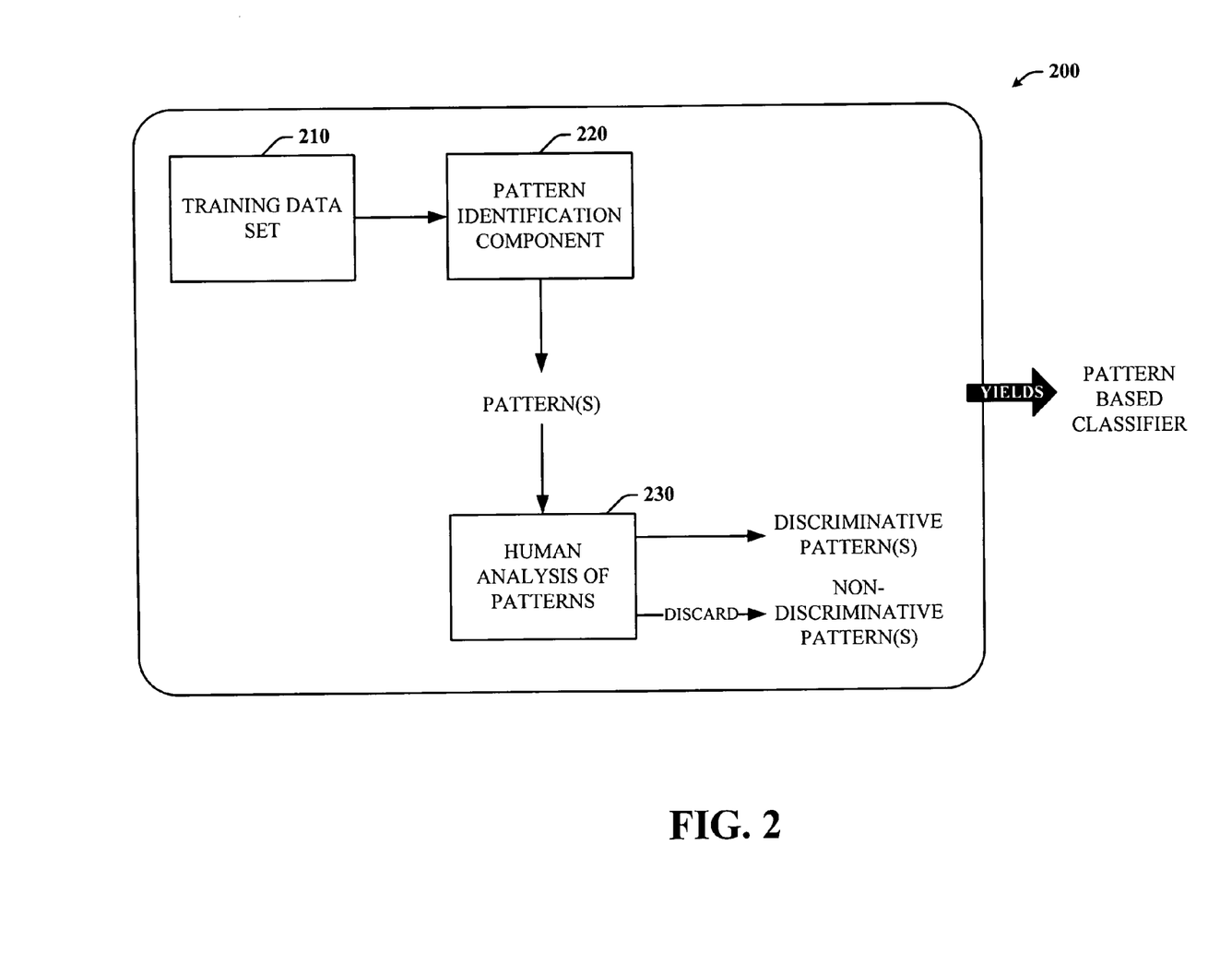
FIG. 2 is a block diagram of an exemplary training system 200 that can be employed to build a pattern-based classifier.

Referring now to FIG. 2, there is a general block diagram of an exemplary training system 200 that can be employed to build a pattern-based classifier. The training system 200 includes a set of training data 210 which can be examined by a pattern identification component 220. The pattern identification component 220 discovers as many patterns as possible including patterns with and without gaps. A pattern is an ordered string over words including optional words, disjunctions, and gaps. "Very" is one example of an optional word in the pattern "a (very) good movie". The pattern could match or include "a very good movie" or "a good movie". An example of a disjunction is "a waste of {time, money, talent}" which could match any one of the following: "a waste of time", "a waste of money" or "a waste of talent." An example of a gap is: "is . . . best coffee I have had" though such gaps are permitted if they occur within the same sentence.

Pattern discovery can be further described as follows. Imagine that with a vocabulary V over words, a text pattern can be defined as an ordered sequence of elements from V∪{*,(,)}. A sentence matches a pattern if it contains the symbols of the pattern in identical order and without gaps. Here, the '*' matches an arbitrary sequence of words of length ≧0 and the brackets ( ) are used to indicate disjunctions. That is, the pattern "a*(good bad) product" would match both of these sentences: "This is a good product." and "A very bad product." Patterns do not match sentences across sentence boundaries. Document d matches a pattern p, if a sentence in d matches p. For a set of documents D, the frequency of a pattern p can be defined as the number of distinct documents in D that match p. A pattern p can be referred to as maximal for a document collection if no pattern p' exists for which it holds that (a) p is a subsequence of p' and (b) every sentence that matches p also matches p'.

In order to enable humans to reason over patterns accurately, the pattern identification component 220 needs to account for language constructs that invalidate a dependent phrase. To illustrate this, consider the text pattern "I like your product". In the context of the sentiment-classifier example, this phrase may induce the user to assign a +label to the feedback mail; however, if the phrase is dependent on a negation, such as "It's not true that I like your product," this conclusion would be invalid—even though the invalidating construct does not show up (from the standpoint of pattern matching) as part of the pattern itself. Based on experimental data, humans cannot reliably reason over discriminating pattern candidates when they frequently occur in sentences containing phrases that invalidate them. In the experimental datasets, four main classes of constructs that acted in this manner were studied:

Negation (e.g., "It's not the case that . . . ")

Subjunctive (e.g., "Were it the case that . . . ")

Conditionals (e.g., "If this is such a good product, then why . . . ")

Factives and speech (e.g., "He claims that . . . ")

These can be referred to as invalidating constructs. In order to account for them in the subject classification system, we extend the definition of matching a pattern as follows: a sentence containing an invalidating construct matches a text pattern only if the invalidating construct is part of the pattern itself. For example, the sentence "don't buy this product" matches the pattern "don't buy this" but not "buy this product". Hence, the text pattern includes the invalidating construct as well as any other words or phrase to mitigate human confusion or inaccurate labeling.

The pattern identification component 220 can discover patterns in the training data set using the following notation: given a set of documents D={$d_1, \ldots d_n$}, with each document labeled with a label l from L={$l_1, \ldots, l_h$}, the label of a document d∈D can be denoted by Label(d)∈L. For a training document set D and a pattern p, the probability of a label l given p can be defined as $$Pr(l, p) := \frac{|\{d \in D \mid d \text{ matches } p_i \wedge L(d) = l\}|}{|\{d \in D \mid d \text{ matches } p_i\}|}$$

In practice, for instance, imagine the following problem statement:

Given a set of labeled documents D={$d_1, \ldots d_n$} and a threshold α on the required minimum probability induced by a pattern, compute the k most frequent patterns $p_1, \ldots, p_k$, such that for each $p_i$ it holds that $$\max_{l \in L} Pr(l, p_i) > \alpha$$

To compute these patterns, an algorithm that is based on a search structure over multiple suffix arrays can be employed. Suffix arrays may be viewed as a compact representation of suffix trees, with the major advantage that their space requirements do not grow with the size of the vocabulary V over which patterns are constructed. Moreover, the algorithms that can be employed herein use main memory only since space-efficiency becomes important for large training sets.

In particular, a scalable algorithm as follows can discover patterns without gaps. A suffix-array for a text T over N dictionary items T[1] . . . T[N] is an array of integers that stores the starting positions of the lexicographically ordered suffixes in T. That is, if the suffix T[p]k . . . T[N] starting at position p by $T_p$ is denoted, then a suffix array SA[1 . . . N] is a permutation of the integers 1, . . . , N such that $T_{SA[1]} <_{lex} T_{SA[2]} <_{lex} \cdots <_{lex} T_{SA[N]}$, where $<_{lex}$ denotes lexicographic order. Suffix arrays can be constructed in linear time. Once a suffix array has been constructed, we then use a variation of the algorithm proposed to compute Pr(l, p) for all labels l and maximal patterns p occurring in D as follows: this algorithm computes the document frequency df of all maximal patterns via a single scan over the suffix array in time O(N log N) and requiring space O(N), with N being the number of words in D. This algorithm can be modified to keep track of the document frequency of a pattern for each label separately, which allows the computation max l∈L Pr(l, $p_i$) for a pattern with O(log |L|) overhead.

To discover patterns with gaps, all patterns without gaps $p_i, \ldots p_h$ are computed using the algorithm described above. For every pattern $p_i$ found, we then expand the pattern. For example, all patterns of the form $p_i$*p' with p' a pattern over V can be computed as follows:

Consider a pattern $p_i$ in T that ends at the positions T[$pos_1$], . . . , T[$pos_l$]. Then any pattern of the form $p_i$*p' (since patterns cannot cross sentence boundaries) must occur within the sentences containing the positions $pos_1, \ldots, pos_l$. Consequently, if we expand each position $pos_j$ to the set suffix ($pos_j$):=$pos_j, \ldots, pos_j + e_j$, where the position $pos_j + e_j$ corresponds to the end of the sentence containing the position $pos_j$, and construct a suffix array SA' over the text at the positions suffix($pos_1$)∪suffix($pos_l$), then any pattern p' occurring in SA' implies that the pattern $p_i$*p' occurs in T, ending at the same position as $p_i$.

By repeating these expansions on all frequent patterns encountered, the component 220 can compute the most frequent patterns in a document collection that satisfy the condition of Pr(l, p). Because expansion can only discover in patterns with a frequency lower than or equal to the pattern that is expanded, this can be used to prune the set of patterns to expand more effectively. Moreover, by choosing the order in which to expand the patterns carefully, the memory requirements of this search-algorithm can be controlled and/or kept small.

Once the patterns with and/or without gaps are discovered, at least a subset of them can be presented to a user for human analysis 230. Patterns which are selected as discriminative can be kept while non-discriminative patterns can be discarded (by the user).

Figure 3:
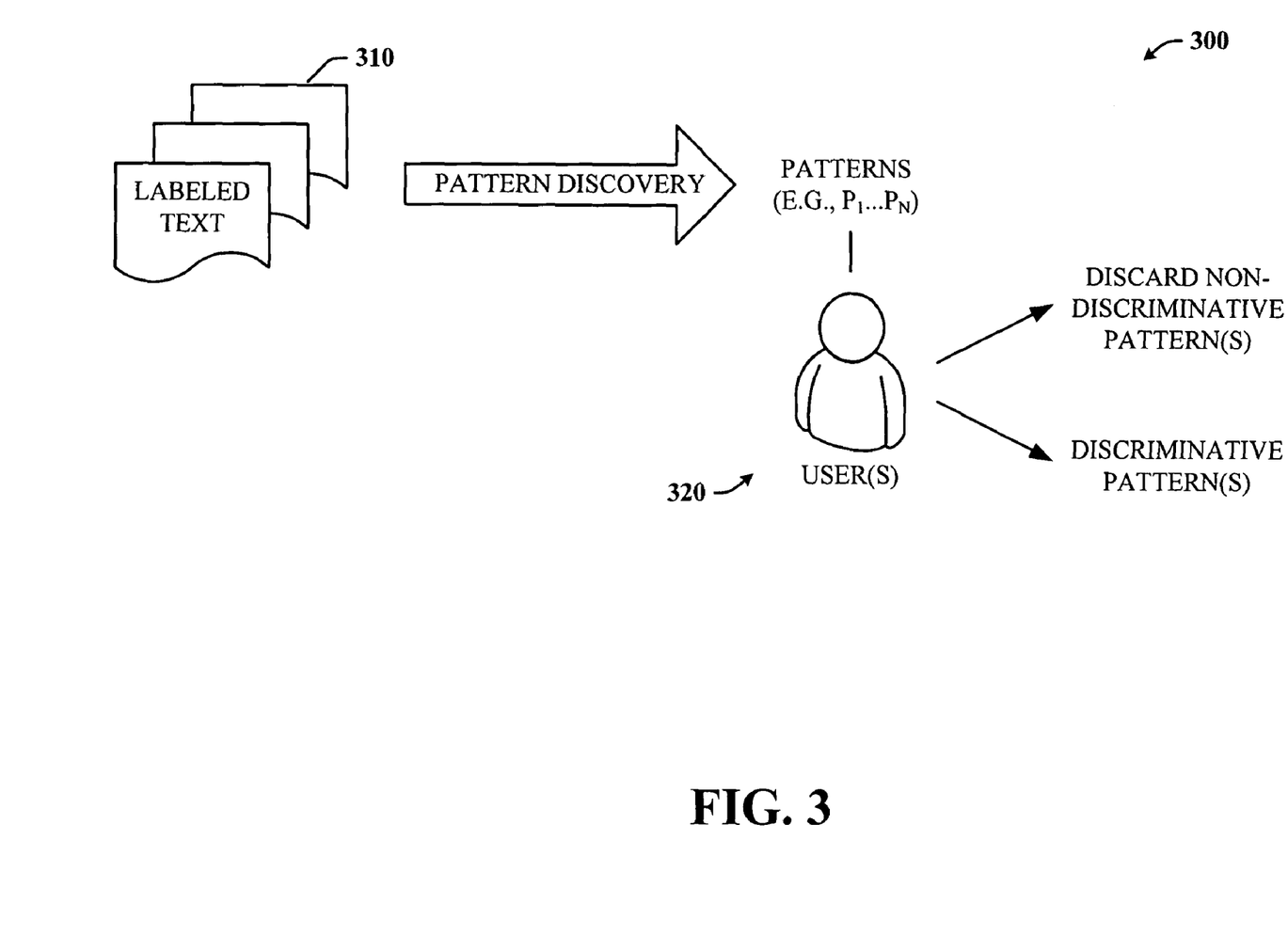
FIG. 3 is a block diagram that demonstrates the construction of a pattern-based classifier.

The schematic diagram in FIG. 3 further demonstrates the construction of a pattern-based classifier. Labeled text documents 310, for example, can be subjected to a pattern discovery process whereby patterns that are presumably related to or associated with the label of each document can be abstracted. At least a subset of the identified patterns can be presented to one or more users 320 who are then tasked with identifying which patterns readily identify the appropriate label to use. The patterns chosen for human processing can be selected in part by their frequency of occurrence throughout the set of training items and a correlation threshold.

For example, the pattern "coffee" may have a 45% correlation whereas the pattern "coffee is . . . good for you" may have an 85% correlation. The % correlation indicates how well the pattern signifies the correct label such as a positive or a negative label. The pattern "coffee" with the 45% correlation is not as effective as the other with the 85% correlation because "coffee" does not necessarily provide any insight as to whether it denotes a positive or a negative sentiment. Thus, the user cannot as easily tell whether the feedback is complimentary or adverse in order to assign it the proper label. However, the sentiment is clearer with the pattern "coffee is . . . good for you."

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 4:
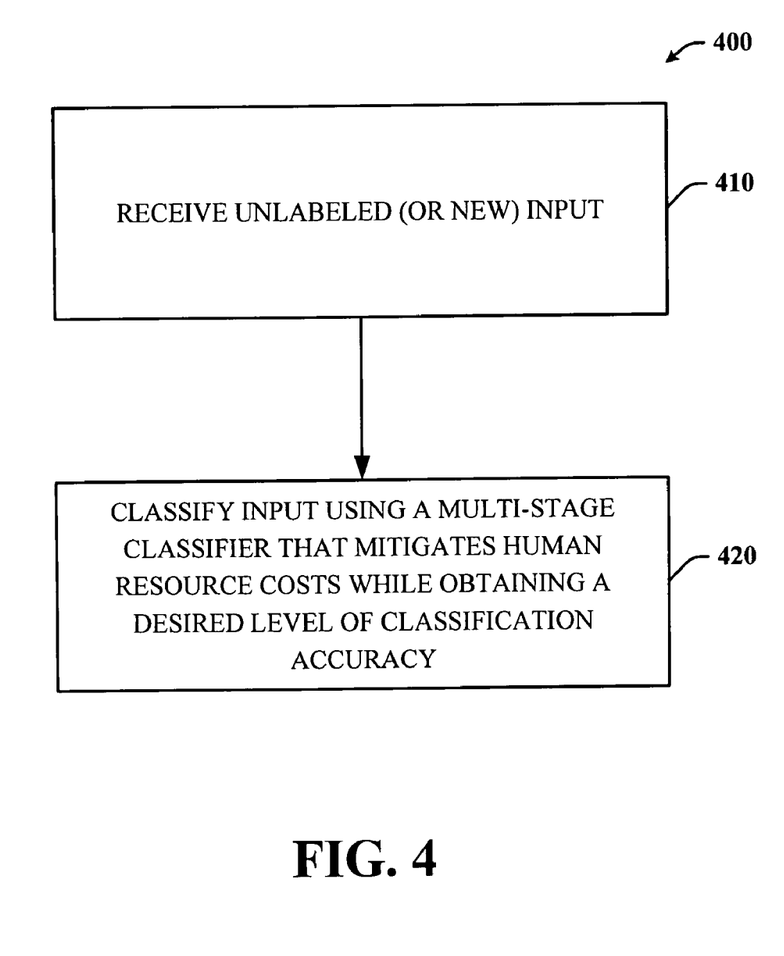
FIG. 4 is a flow chart illustrating an exemplary methodology that facilitates classifying items via a multi-stage classification system.

Turning to FIG. 4, there is a flow chart illustrating an exemplary method 400 that facilitates classifying items via a multi-stage classification system. The method 400 involves receiving unlabeled input such as text documents at 410 and at 420, classifying at least a portion of the unlabeled input using a multi-stage classifier. The multi-stage classifier can include a pattern-based classifier that initially processes the input to assign each input item a label. When the pattern-based classifier is unable to assign a label to an item, the item can be processed by a second classifier such as a learning-based classifier.

Figure 5:
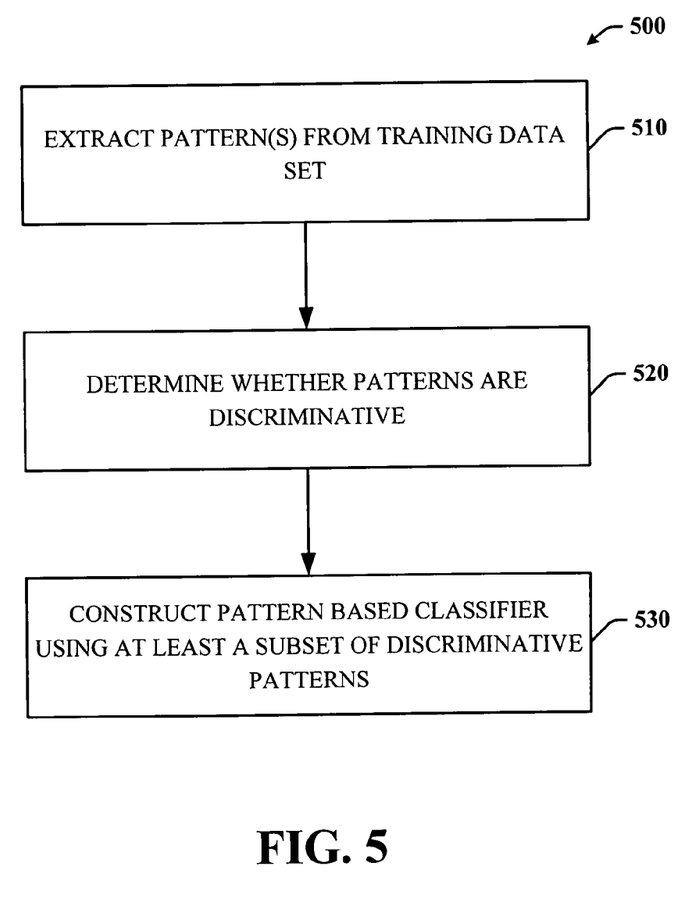
FIG. 5 is a flow chart illustrating an exemplary methodology that facilitates constructing a pattern-based classifier.

Referring now to FIG. 5, there is a flow chart illustrating an exemplary method 500 that facilitates constructing a pattern-based classifier. The method 500 involves extracting patterns from a set of training data (e.g., labeled documents) at 510. The extracted patterns are tied to the label of the document; however, some patterns are more indicative of the appropriate label than others. Such patterns can be referred to as discriminative patterns. At least a subset of the extracted patterns can be presented to one or more users for human analysis to determine which extracted patterns are discriminative at 520—that is, which patterns on their own (e.g., with no other context provided) are sufficient to assign a label with a high degree of certainty and accuracy. For example, the label can be either "spam" or "not spam". When a user sees a pattern "try . . . for free", he/she may determine that the pattern is discriminating in terms of spam and assign it the "spam" label. At 530, the discriminative patterns can be employed to assign labels to any incoming, unlabeled items including text documents, messages, and the like.

As mentioned in FIG. 5, at least a subset of the extracted patterns is presented to users for human analysis. In fact, the number of patterns shown to the users can be pruned in order to optimize the usage of the human resources. Patterns that occur more frequently and that highly correlate to the particular label are more likely to be discriminating, and thus more effective in classifying unknown items with a higher level of accuracy. For example, the pattern "I like . . . " may be found to occur frequently in the training documents and may have a 90% correlation to a positive label compared to a pattern "RMAIL" (where RMAIL would be the name of a competing product) which may occur just as frequently but only with a 50% correlation. Hence, it is likely that the pattern "RMAIL" less accurately signifies one label over another. A minimum correlation threshold can be set or determined according to the type of classification or text processing desired. It should be appreciated that the correlation threshold can be set at any value >0.

Figure 6:
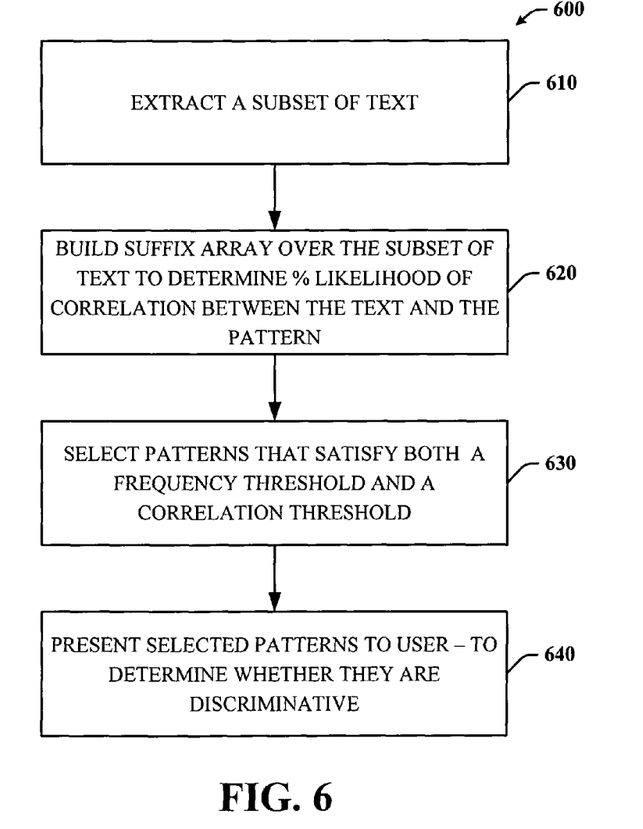
FIG. 6 is a flow chart illustrating an exemplary methodology that facilitates identifying or discovering patterns.

FIG. 6 shows a flow chart illustrating an exemplary method 600 that facilitates determining which patterns are presented to the users for human analysis. The method 600 involves extracting a subset of text from a training item at 610. At 620, one or more suffix arrays can be built over the subset of text to determine the correlation between the pattern and the label assigned to the text. The patterns that satisfy a frequency threshold and/or a correlation threshold can be selected at 630 and presented to the user(s) at 640 for human analysis. In particular, the user(s) can determine whether such patterns are discriminative. Non-discriminating patterns can be discarded.

Figure 7:
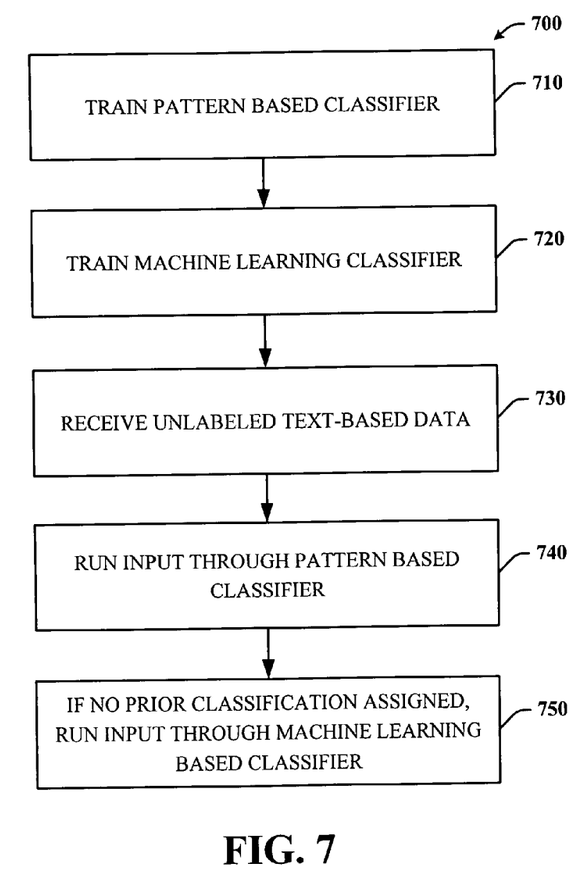
FIG. 7 is a flow chart illustrating an exemplary methodology that facilitates building a two-stage classification system and applying it to (new) incoming items.

Referring now to FIG. 7, there is a flow chart illustrating an exemplary method 700 that facilitates building a two-stage classification system and applying it to (unlabeled) incoming items. The method 700 involves training a pattern-based classifier on a set of labeled items at 710. At 720, a machine learning classifier can be trained on the same or similar set of labeled items. Unlabeled text-based data can be received at 730 such as customer feedback regarding a product or service, for example. At 740, the data can be run through the pattern-based classifier to determine if any discriminative patterns match the content of the data. When a pattern match exists, the label associated with the pattern can be assigned to the data. For instance, if the pattern "waste of money" is found in the data and a negative label is associated with this pattern, then the data can be labeled accordingly. Conversely, if the pattern "good value" is found in the data and a positive label is associated with this pattern, then the data can be assigned a positive label. However, if there is no pattern match at 740, then the data can be processed using a machine learning classifier at 750. Experimental data indicates that given the decreased level of investment in terms of at least reducing the human effort required and employing a substantially smaller set of training data and patterns to analyze, the classification of new or unknown items was more accurate than conventional practices such as a pure machine learning approach.

Figure 8:
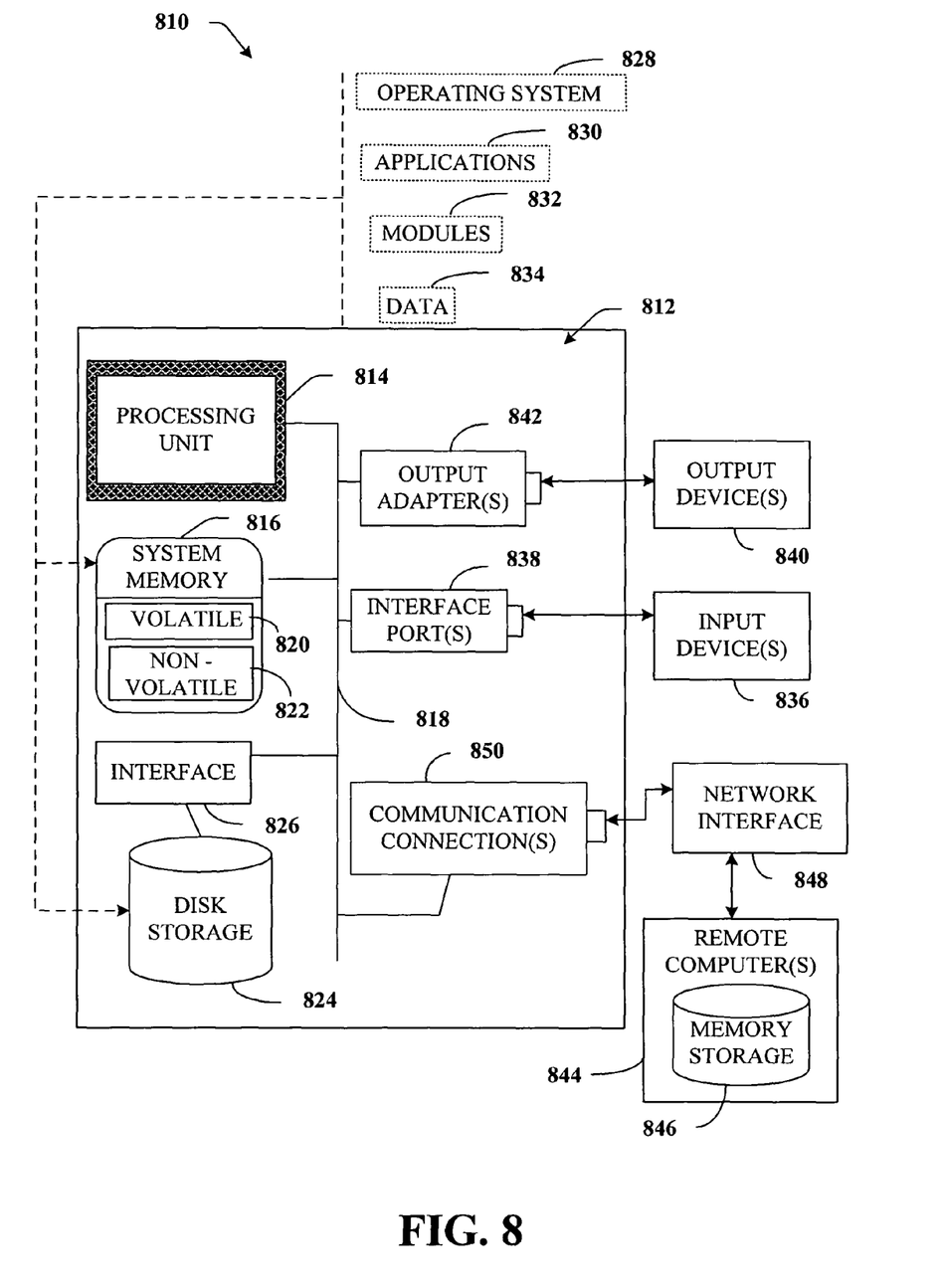
FIG. 8 illustrates an exemplary environment for implementing various aspects of the invention.

In order to provide additional context for various aspects of the subject application, FIG. 8 and the following discussion are intended to provide a brief, general description of a suitable operating environment 810 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the system and/or method includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject system and/or method can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812 and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented multi-stage classification system that facilitates reducing human effort in text classification while obtaining a desired level of accuracy comprising:
   one or more processors;
   memory, accessible by the one or more processors;
   a pattern-based classifier component stored in the memory and executable on the one or more processors to assign the input a label assign a label to the input, and to build one or more suffix arrays over a subset of text from the set of training items to determine correlation between each pattern of a plurality of patterns and the label, the pattern-based classifier component to classify the input as having a pattern of the plurality of patterns when a corresponding correlation satisfies a correlation threshold the set of training items comprising at least one of text documents, messages, and files that are each labeled based on one or more text patterns; and
   a learning-based classifier component stored in the memory and executable on the one or more processors to process the input for classification when no label is assigned to the input by the pattern-based classifier component.

2. The system of claim 1, wherein the pattern-based classifier component is to further extract the plurality of patterns from the set of training items.

3. The system of claim 2, further comprising a display component stored in the memory and executable on the one or more processors to present each of the plurality of patterns to one or more users to facilitate determining which patterns are discriminative.

4. The system of claim 2, wherein the pattern-based classifier component identifies the plurality of patterns in the set of training items in a scalable manner to facilitate conserving memory consumption.

5. The system of claim 1, wherein the pattern-based classifier component is to assign a label to each item in the set of training items, in which a probability of a label l given a pattern p is defined as:

$$Pr(l, p) := \frac{|\{d \in D \mid d \text{ matches } p_i \wedge L(d) = l\}|}{|\{d \in D \mid d \text{ matches } p_i\}|}$$

In which $D=\{d_1, \ldots d_n\}$ is the set of training items, and each item is labeled with a label l from $L=\{l_1, \ldots l_h\}$, and a label of an item $d \in D$ is denoted by $Label(d) \in L$.

6. The system of claim 1, wherein the learning-based classifier component is a machine learning classifier component that is trained on the same set of training items used to train the pattern-based classifier component.

7. A computer-readable memory having computer-executable instructions that, when executed, cause one or more processors to perform a method of classification that facilitates reducing human effort in text classification while obtaining a desired level of accuracy, comprising:
   training a pattern-based classifier which comprises:
      providing a set of training texts;
      identifying patterns in the training texts, the patterns being an ordered string over words comprising at least one of optional words, disjunctions and gaps;
      presenting at least a subset of the patterns to a user;
      receiving a selection of at least one of the subset of the patterns as one or more discriminative patterns by the user; and
      assigning a corresponding label to each discriminative pattern;
   receiving an unlabeled input document; and
   classifying the unlabeled input document using a multi-stage classifier, the multi-stage classifier comprising the pattern-based classifier and a learning-based classifier, wherein the unlabeled input is classified using the learning-based classifier when the pattern-based classifier is unable to assign at least one corresponding label of the one or more discriminative pattern to the unlabeled input document as the unlabeled input document does not match the one or more discriminative patterns.

8. The computer-readable memory of claim 7, wherein the unlabeled input document is determined to not match the one or more discriminative patterns when each correlation between the unlabeled input document and each discriminative pattern does not satisfy a correlation threshold.

9. The computer-readable memory of claim 7, further comprising storing the discriminative patterns and discarding any non-discriminative patterns.

10. The computer-readable memory of claim 7, wherein the instructions further comprise selecting the subset of patterns for presentation to the user based at least in part on at least one of a frequency of occurrence of each pattern in the set of training texts and a correlation threshold between each pattern of the subset of patterns and a positive or negative label.

11. The computer-readable memory of claim 7, wherein the identifying the patterns in the training texts is scalable to minimize memory usage.

12. The computer-readable memory of claim 7, wherein the learning-based classifier is a machine learning classifier.

13. The computer-readable memory of claim 12, wherein the instructions further comprise training the machine learning classifier with the training texts used to train the pattern-based classifier.

14. A computer-readable memory having computer-executable instructions that, when executed, cause one or more processors to perform a method of classification that facilitates minimizing human effort in text classification while obtaining a desired level of accuracy comprising:
   training a pattern-based classifier, the training comprises:
      providing a set of training documents;
      identifying patterns in the set of training documents, the patterns being an ordered string over words comprising at least one of optional words, disjunctions and gaps;
      selecting a subset of the identified patterns that satisfy at least one of a frequency threshold and a correlation threshold; and
      determining a discriminative pattern from the subset of patterns;

running an unlabeled text item through the pattern-based classifier to determine whether one or more portions of text in the unlabeled text item matches the discriminative pattern;

when the one or more portions of the text matches the discriminative pattern, assigning a label that corresponds to the discriminative pattern to the text item; and when the one or more portions of the text does not match the discriminative pattern, running the unlabeled text item through a machine learning classifier.

15. The computer-readable memory of claim 14, wherein the instructions further comprise training the machine learning classifier using the set of training documents used by the pattern-based classifier.

16. The computer-readable memory of claim 14, wherein the instructions further comprise storing the at least one discriminative pattern.

* * * * *